(12) United States Patent
Chen

(10) Patent No.: US 6,640,686 B2
(45) Date of Patent: Nov. 4, 2003

(54) ROTATABLE CYLINDER

(75) Inventor: Chun-Chih Chen, Changhua Hsien (TW)

(73) Assignee: Chia Her Machinery Co., Ltd. (TW)

( * ) Notice: Subject to any disclaimer, the term of this patent is extended or adjusted under 35 U.S.C. 154(b) by 83 days.

(21) Appl. No.: 10/071,625

(22) Filed: Feb. 8, 2002

(65) Prior Publication Data

US 2002/0112576 A1 Aug. 22, 2002

(30) Foreign Application Priority Data

Feb. 22, 2001 (TW) .................................... 90202646 U

(51) Int. Cl.[7] ............................................... F15B 13/04
(52) U.S. Cl. .......................................... 91/420; 92/106
(58) Field of Search .............................. 92/106; 91/196, 91/420, 446; 279/4.01

(56) References Cited

U.S. PATENT DOCUMENTS 3,641,875 A * 2/1972 Kodalle ....................... 91/420
4,762,050 A * 8/1988 Marchand ................... 91/420
6,220,143 B1 * 4/2001 Yoshida ...................... 92/106

* cited by examiner

Primary Examiner—Edward K. Look
Assistant Examiner—Michael Leslie
(74) Attorney, Agent, or Firm—Jackson Walker L.L.P.

(57) ABSTRACT

A cylinder has a rotating member, a cap, a piston, a collar, two control valves and two check valves. The piston is moveably mounted between the rotating member and the cap. The piston has a flange dividing the inner space between the rotating member and the cap into two chambers. The control valves are attached to the rotating member, respectively communicate with the chambers and respectively communicate with two I/O channels in the collar. The check valves are attached to the rotating member, respectively communicate with the chambers and respectively communicate with the I/O channels in the collar. Accordingly, the thickness of the flange of the piston can be decreased so as to reduce the weight of the cylinder, and the torsion for rotating the cylinder and the load to the axle of the machine are also reduced.

14 Claims, 9 Drawing Sheets

ROTATABLE CYLINDER

BACKGROUND OF THE INVENTION

1. Field of the Invention

The present invention relates to a rotatable cylinder, and more particularly to a cylinder with a rotatable rod for a working machine such as a lathe.

2. Description of Related Art

A working machine such as a lathe always has a rotatable cylinder co-axially attached to the axle of the machine and connected to the clamping device of the machine. The rotatable cylinder can rotate with the axle of the machine and can actuate the clamping device to hold or to release a working piece. A hydraulic or a pneumatic pressure source is connected to the cylinder to control the extension and the retraction of the piston rod of the cylinder. Two check valves are mounted in the cylinder to release the pressure when the pressure applied to the cylinder is higher than a desired level. In the conventional cylinder, the check valves are attached to the flange of the piston.

However, with the check valves being attached to the flange of the piston, the flange has to be particularly thick which results in the piston being excessively heavy. Accordingly, this weight is detrimental to the operation of the lathe because of the torsion and axle load involved. To overcome the shortcomings, the present invention tends to provide a rotatable cylinder to mitigate or obviate the aforementioned problems.

SUMMARY OF THE INVENTION

The main objective of the invention is to provide a rotatable cylinder for a machine and having a lower weight than a conventional one. The cylinder has a rotating member, a cap, a piston, a collar, two control valves and two check valves. The piston is moveably mounted between the rotating member and the cap. The piston has a flange dividing the inner space between the rotating member and the cap into two chambers. The collar is mounted around the rotating member and has first and second I/O channels defined in the collar. The control valves are attached to the rotating member to respectively communicate with the chambers and further respectively communicate with the I/O channels in the collar. The check valves are attached to the rotating member to respectively communicate with the chambers and further respectively communicate with the I/O channels in the collar. Accordingly, the flange of the piston is relatively thin and thus the cylinder is lightweight whereby the cylinder and axle of the machine can be efficiently operated. Other objects, advantages and novel features of the invention will become more apparent from the following detailed description when taken in conjunction with the accompanying drawings.

DETAILED DESCRIPTION OF PREFERRED EMBODIMENT

Figure 1:
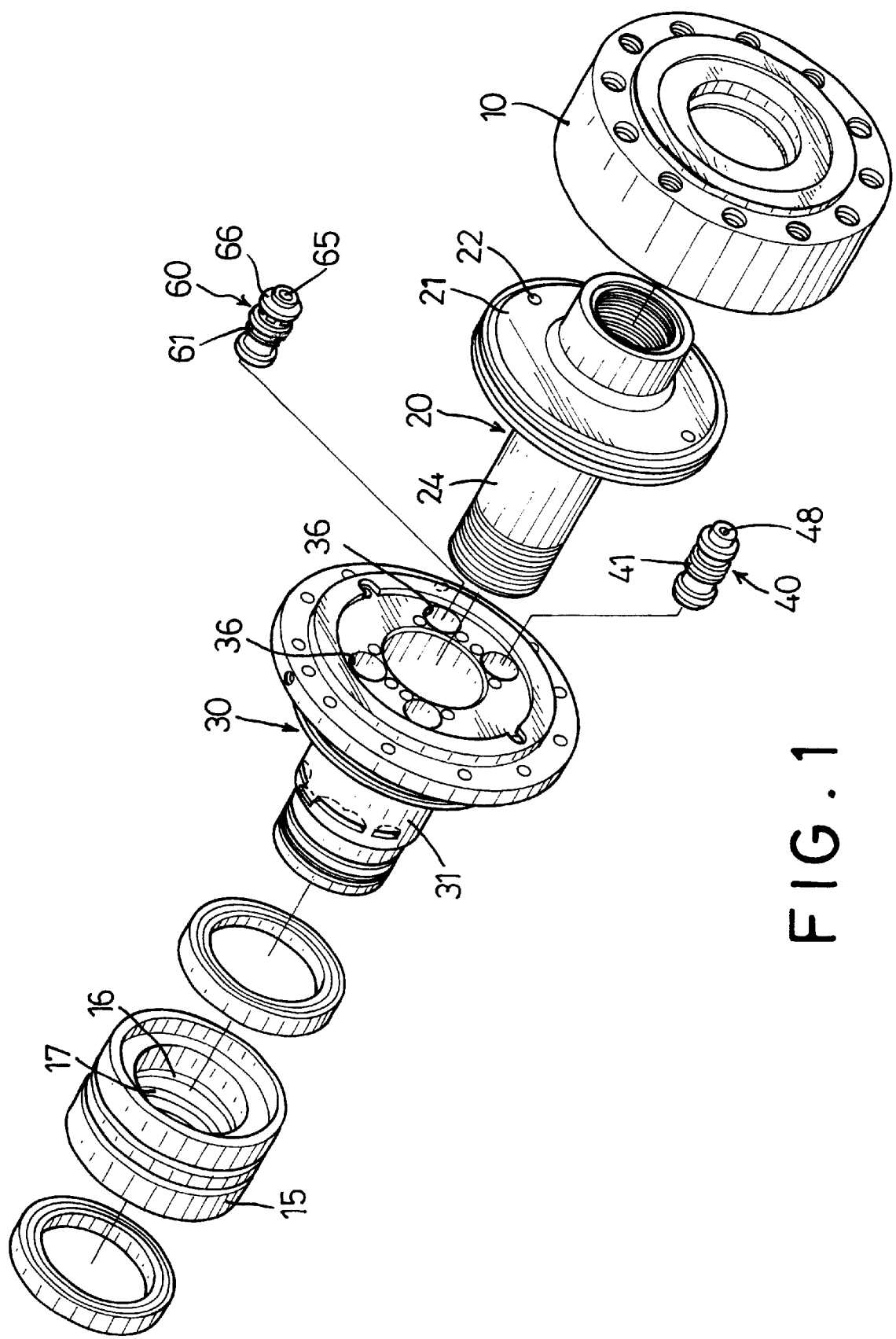
FIG. 1 is an exploded perspective view of a rotatable cylinder in accordance with the present invention.
Figure 2:
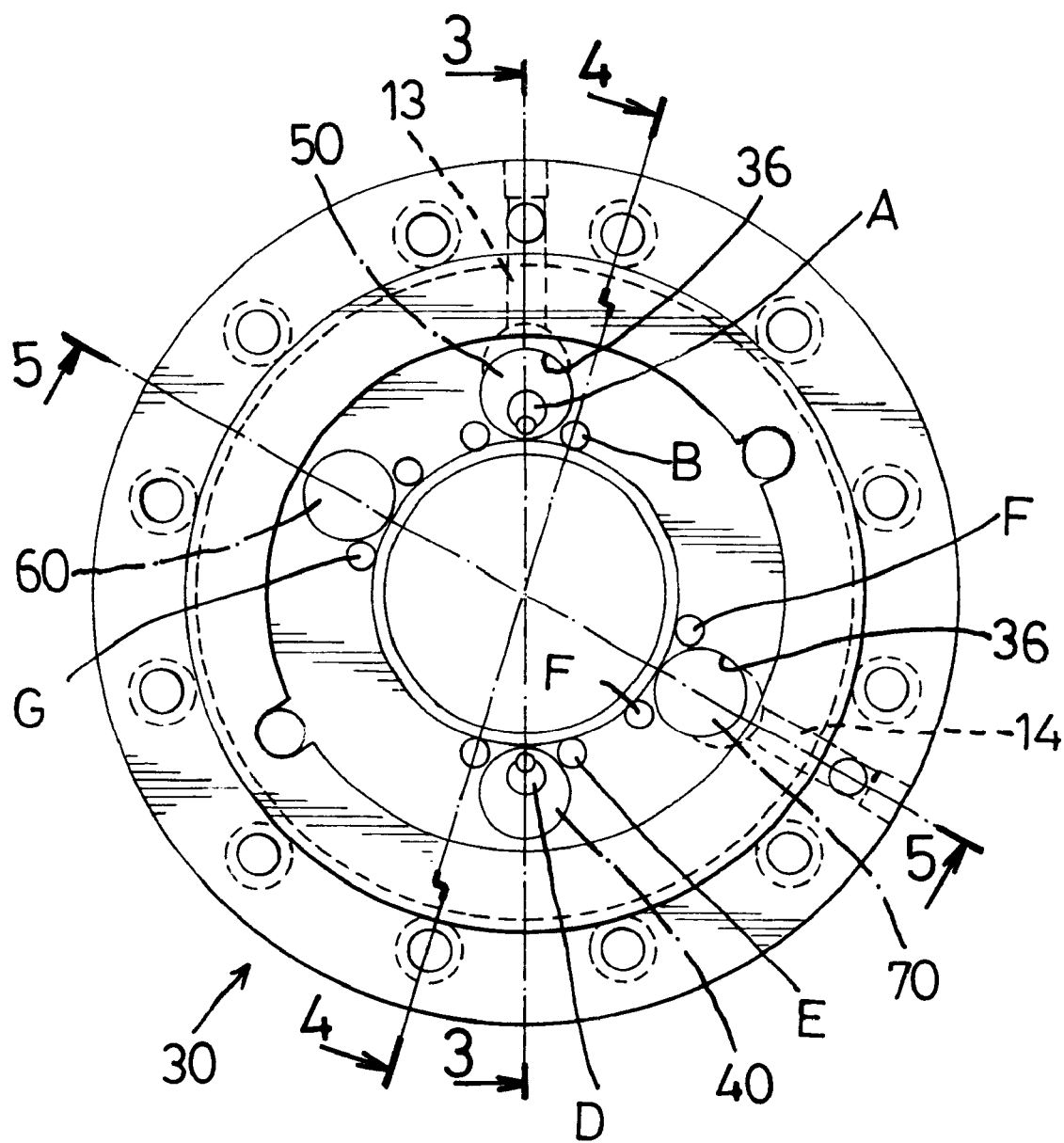
FIG. 2 is an end plan view of the rotating member of the rotatable cylinder in FIG. 1.
Figure 3:
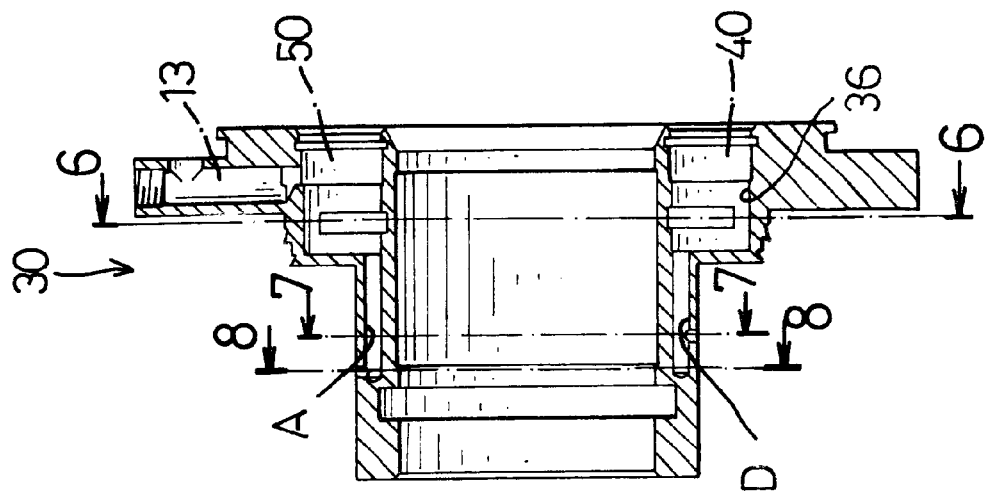
FIG. 3 is a cross sectional side plan view of the rotating member along the 3—3 line in FIG. 2.
Figure 5:
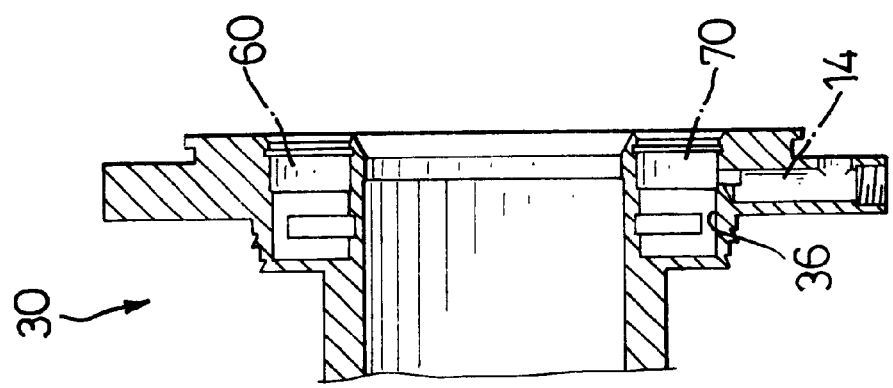
FIG. 5 is a cross sectional side plan view of the rotating member along the 5—5 line in FIG. 2.
Figure 4:
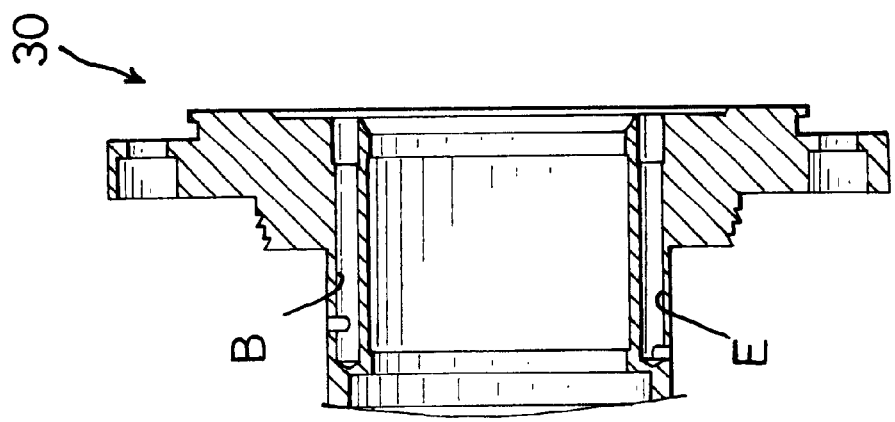
FIG. 4 is a cross sectional side plan view of the rotating member along the 4—4 line in FIG. 2.
Figure 6:
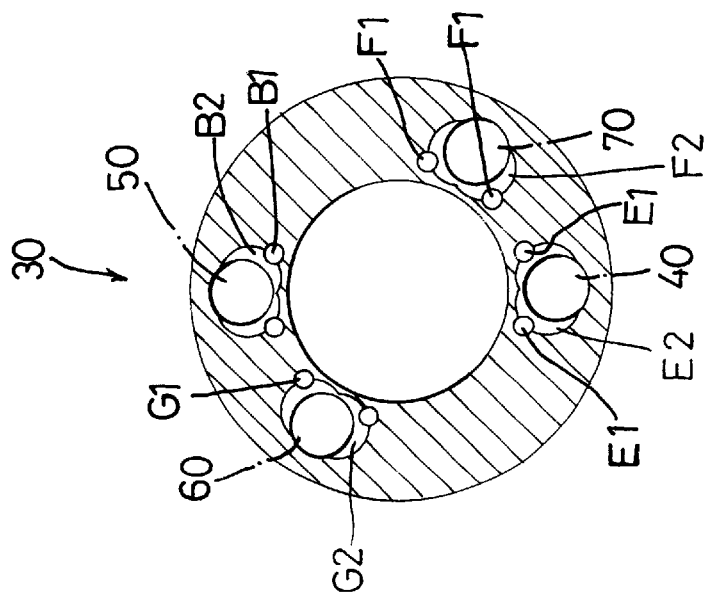
FIG. 6 is a cross sectional end plan view of the rotating member along the 6—6 line in FIG. 3.
Figure 7:
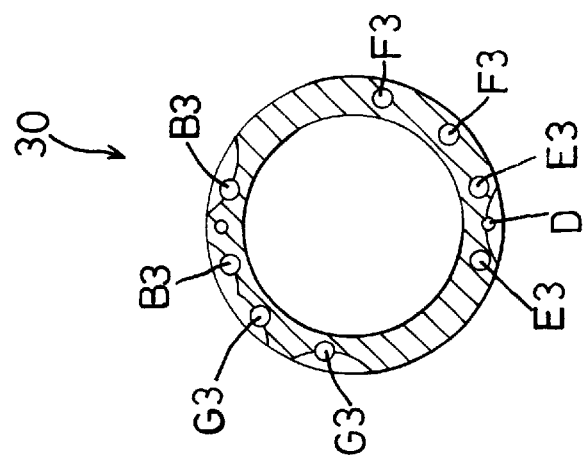
FIG. 7 is a cross sectional end plan view of the rotating member along the 7—7 line in FIG. 3.
Figure 8:
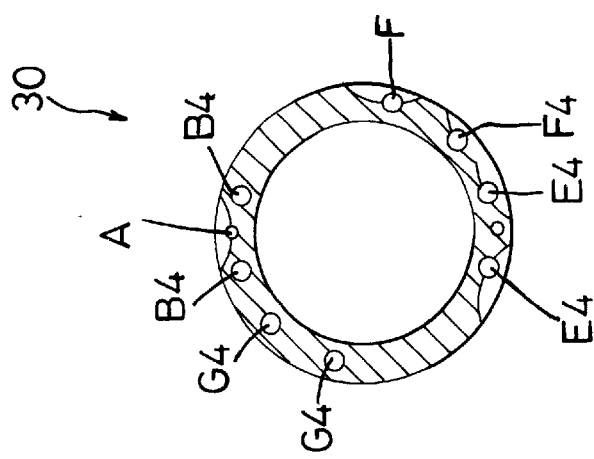
FIG. 8 is a cross sectional end plan view of the rotating member along the 8—8 line in FIG. 3.

With reference to FIG. 1, a rotating cylinder for a working machine in accordance with the present invention comprises a rotating member (30), a cap (10), a piston (20) and a collar (15). The rotating member (30) is rotatably attached to the axle of the machine and has a tube (31) extending from a first end of the rotating member (30).

The cap (10) is securely attached to the second end of the rotating member (30) far from the tube (31) by bolts. The cap (10) is secured to the axle of the machine, such that the rotating member (30) and the cap (10) can rotate with the axle of the machine. An inner space is defined between the cap (10) and the rotating member (30).

Figure 9:
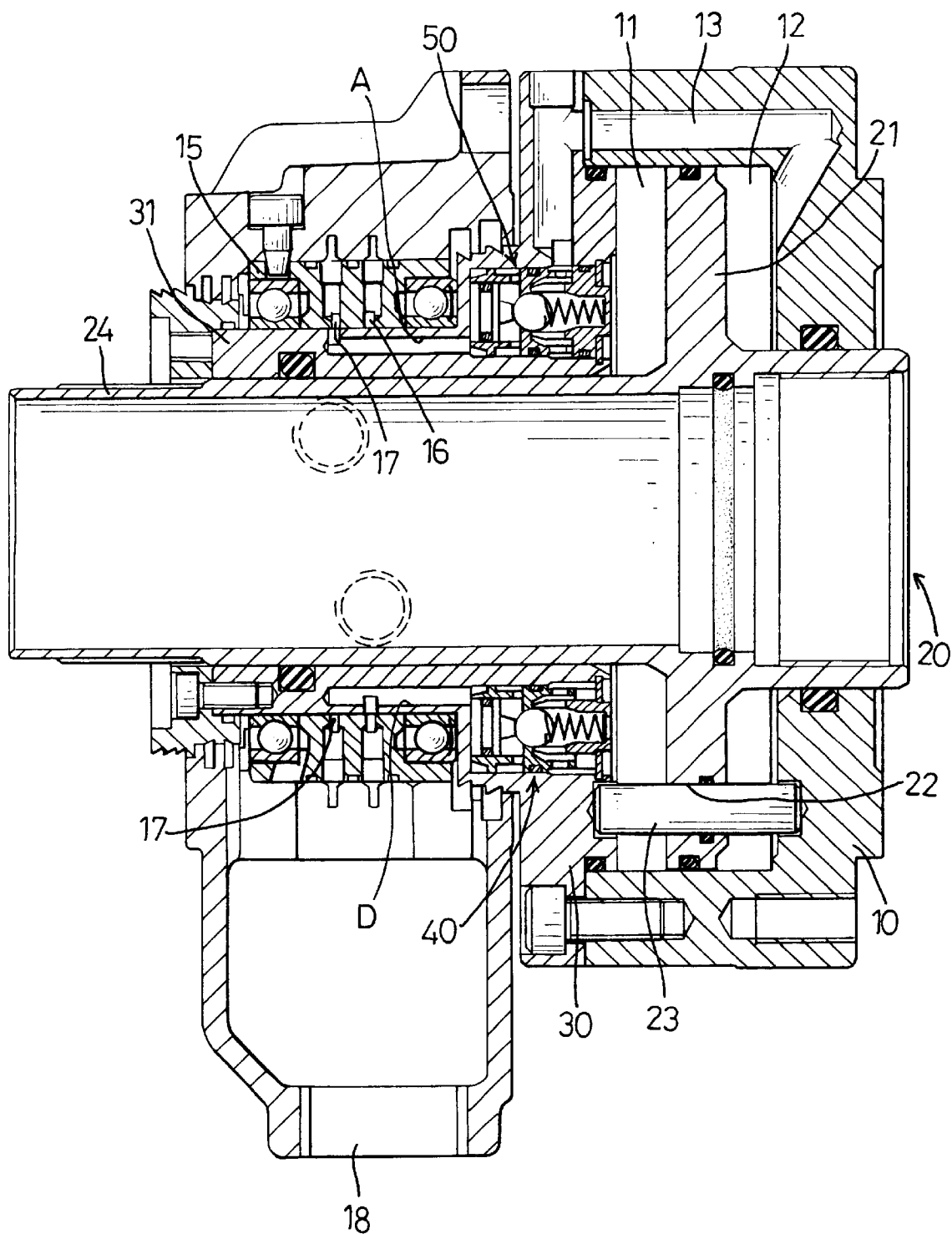
FIG. 9 is a side plan view in partial cross section of the rotating cylinder in FIG. 1 along a direction same to the 3—3 line in FIG. 2.
Figure 10:
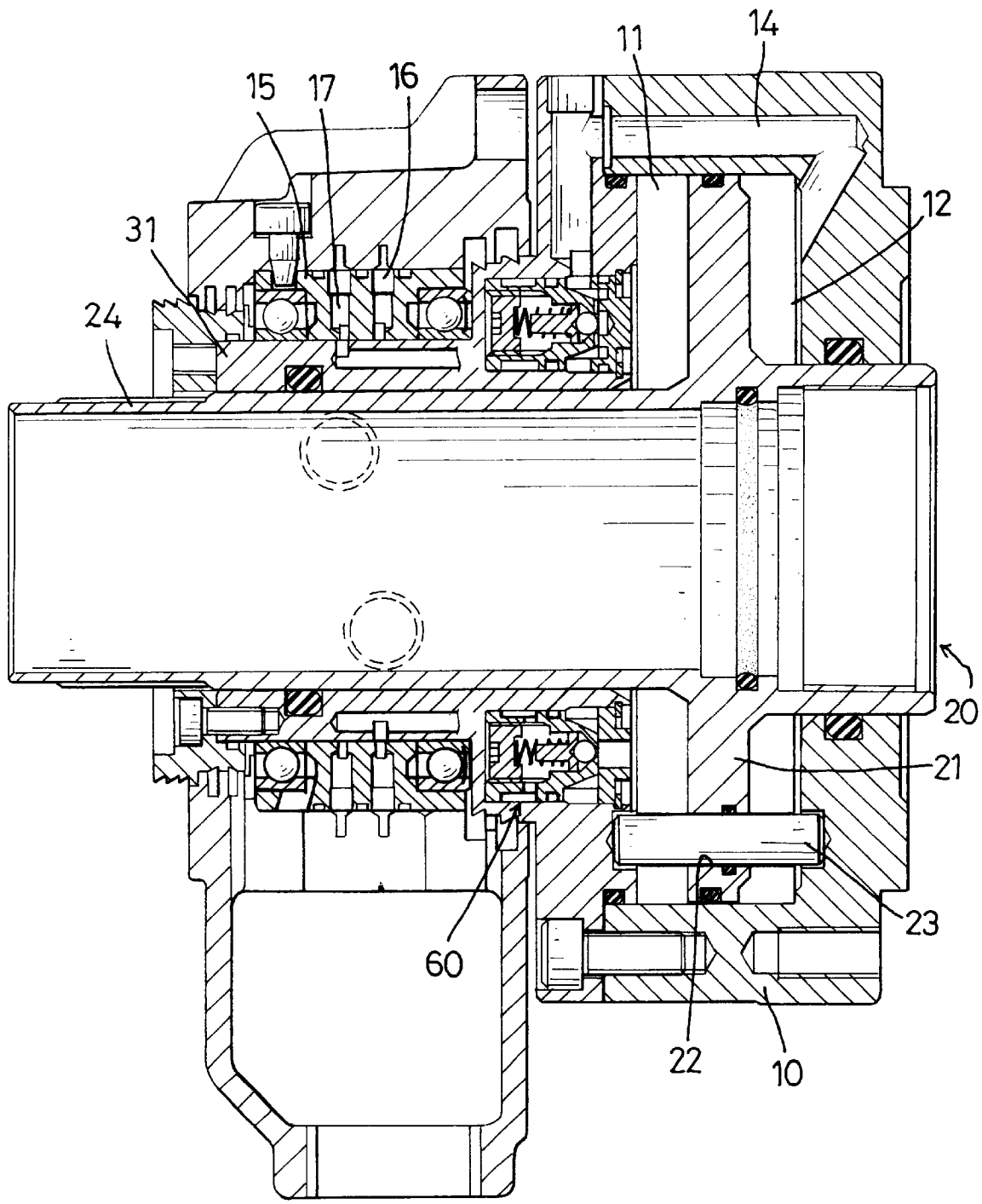
FIG. 10 is a side plan view in partial cross section of the rotating cylinder in FIG. 1 along a direction same to the 4—4 line in FIG. 2.

The piston (20) is moveably mounted between the rotating member (30) and cap (10). The piston (20) has a rod (24) extending outward from the tube (31) of the rotating member (30). A flange (21) is formed on the rod (24) to divide the inner space into a first chamber (11) and a second chamber (12) as shown in FIGS. 9 and 10. Two through holes (22) are defined through the flange (21) along the axial direction of the rod (24). As also shown in FIG. 9, a pin (23) extends through each respective through hole (22) in the flange (21) and has two ends respectively secured to the rotating member (30) and the cap (10). With the arrangement of the pins (23), the piston (20) can smoothly move relative to the rotating member (30) and the cap (10), and the piston (20) can rotate with the rotating member (30) and the cap (10).

The collar (15) is mounted around the tube (31) of the rotating member (30). Two bearings (not numbered) are mounted between the tube (31) and the collar (15), such that the tube (31) can rotate freely relative to the collar (15). First and second I/O channels (16, 17) are defined in the collar (15) and are connected to a pressure source in common. Wherein, the pressure source can be a hydraulic pressure source or a pneumatic pressure source.

With reference to FIGS. 1 to 3 and 5, four main channels (36) are defined in the second end of the rotating member (30). First and second control valves (40, 50) and first and second check valves (60, 70) are respectively received in the main channels (36). A communicating channel (A, D) is defined in the face defining each respective main channel (36) in which one of the control valves (40, 50) is received. The communicating channel (D) corresponding to the main channel (36) receiving the first control valve (40) is communicated with the first I/O channel (16) in the collar (15). The communicating channel (A) corresponding to the main channel (36) receiving the second control valve (50) is communicated with the second I/O channel (17). Consequently, the first and the second control valves (40, 50) are respectively connected to the first and second I/O channels (16, 17) through the communicating channels (A, D).

Two branch channels (B, E, F, G) are defined in the second end of the rotating member (30) and are arranged near each respective main channel (36). With reference to FIGS. 6 to 10, each branch channel (B, E, F, G) has a front section (B1, E1, F1, G1), a middle section (B3, E3, F3, G3) and a distal section (B4, E4, F4, G4) in a sequence from the second end of the rotating member (30) to the first end. The front section (B1, E1, F1, G1) of each respective branch channel (B, E, F, G) is communicated with the corresponding main channel (36) through a corridor (B2, E2, F2, G2). The middle sections (B3, G3) of the branch channels (B, G) corresponding to the second control valve (50) and the first check valve (60) are communicated with the first I/O channel (16) in the collar (15). The distal sections (E4, F4) of the branch channels (E, F) corresponding to the first control valve (40) and the second check valve (70) are communicated with the second I/O channel (17) in the collar (15).

Figure 11:
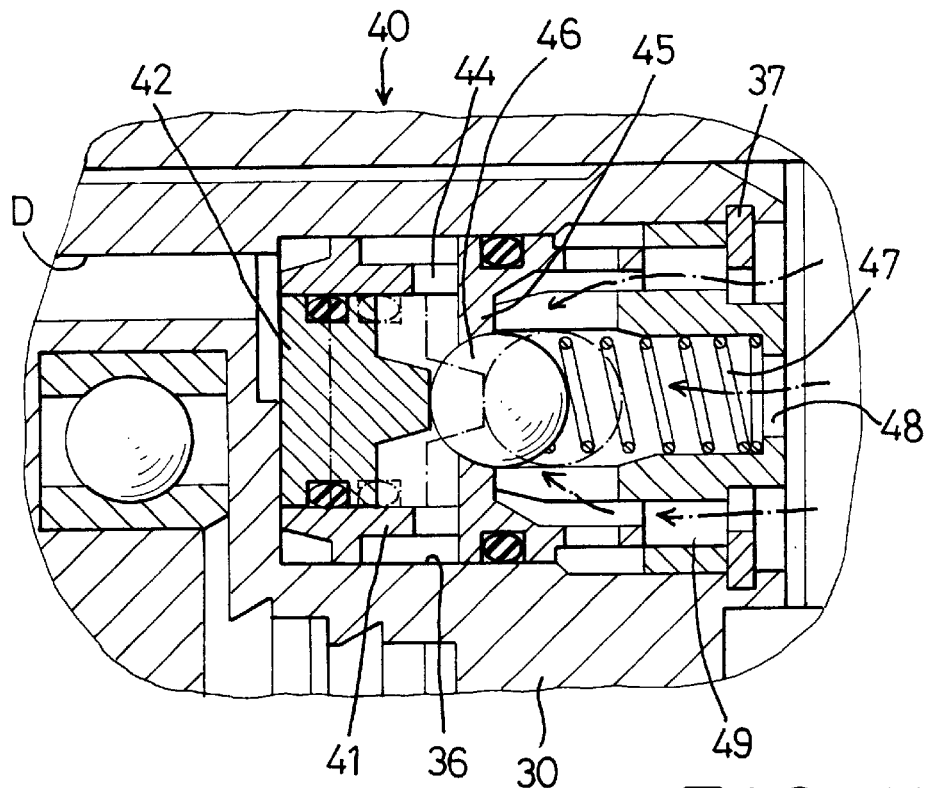
FIG. 11 is an operational enlarged side plan view in partial cross section of the rotating cylinder with the first control valve in FIG. 9 when the pressure source is led into the cylinder through the first I/O channel in the collar.

With reference to FIG. 11, the first control valve (40) has a hollow body (41), a pushing block (42), a ball (46) and a biasing member (47). The body (41) has a first end defining a central bore (48) to communicating with the first chamber (11) and a second end communicating with the communicating channel (D). The pushing block (42) is moveably mounted in the second end of the body (41). A baffle (45) is formed on the middle portion of the body (41) to divide the inner space of the body (41) into two chambers, and a through hole (not numbered) is defined in the baffle (45) to communicate the two chambers in the body (41). Multiple bores (44) are defined in the body (41) and simultaneously communicate with the chamber near the second end of the body (41) and the corresponding branch channels (E). The ball (46) abuts the periphery of the through hole in the baffle (45) at the side far from the pushing block (42) to close the through hole. The biasing member (47) is mounted between the ball (46) and the first end of the body (41) to provide a force of pushing the ball (46) to seal the through hole. In addition, a protrusion (not numbered) is formed on the pushing block (42) and abuts the ball (46).

Figure 12:
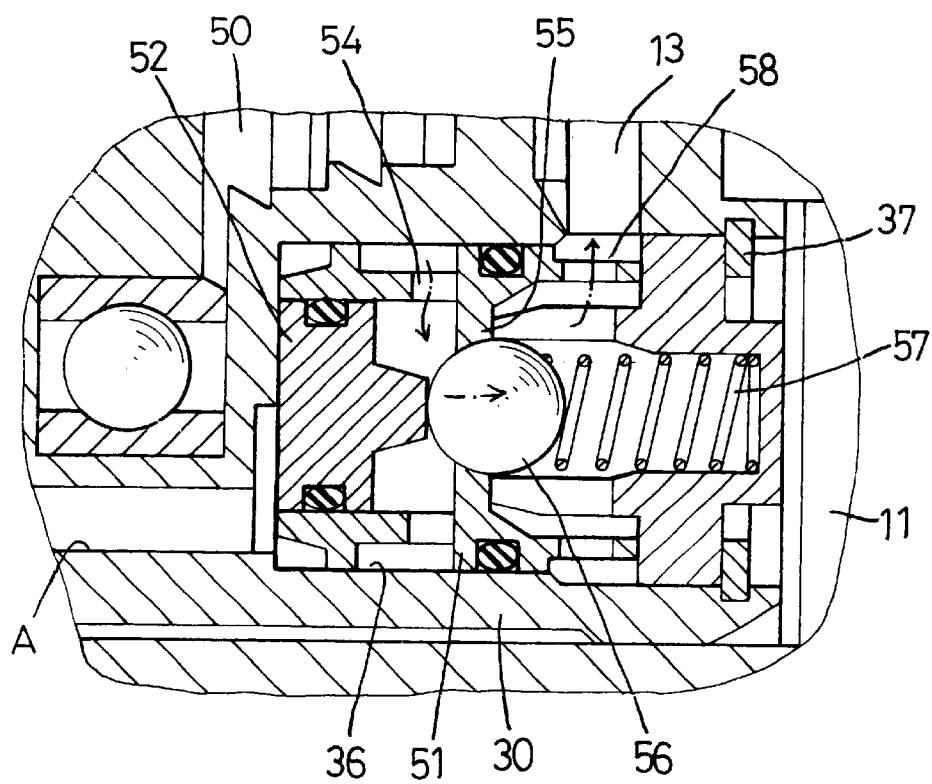
FIG. 12 is an operational enlarged side plan view in partial cross section of the rotating cylinder with the second control valve in FIG. 9 when the pressure source is led into the cylinder through the first I/O channel in the collar.

With reference to FIG. 12, the second control valve (50) has a hollow body (51), a pushing block (52), a ball (56) and a biasing member (57). The body (51) has a first closed end and a second end communicating with the communicating channel (A). The pushing block (52) is moveably mounted in the second end of the body (51). A baffle (55) is formed on the middle portion of the body (51) to divide the inner space of the body (51) into two chambers, and a through hole (not numbered) is defined in the baffle (55) to communicate the two chambers in the body (51). Multiple bores (54) are defined in the body (51) and simultaneously communicate with the chamber near the second end of the body (51) and the corresponding branch channels (B). Multiple apertures (58) are defined in the body (51) and communicate with the chamber near the first end of the body (51). An I/O passage (13) is defined through the rotating member (30) and the cap (10) and has two ends respectively communicating with the second chamber (12) and the apertures (58) in the body (51) of the second control valve (50). The ball (56) abuts the periphery of the through hole in the baffle (55) at the side far from the pushing block (52) to close the through hole. The biasing member (57) is mounted between the ball (56) and the first end of the body (51) to provide a force of pushing the ball (56) to seal the through hole. A protrusion (not numbered) is formed on the pushing block (52) and abuts the ball (56).

Figure 13:
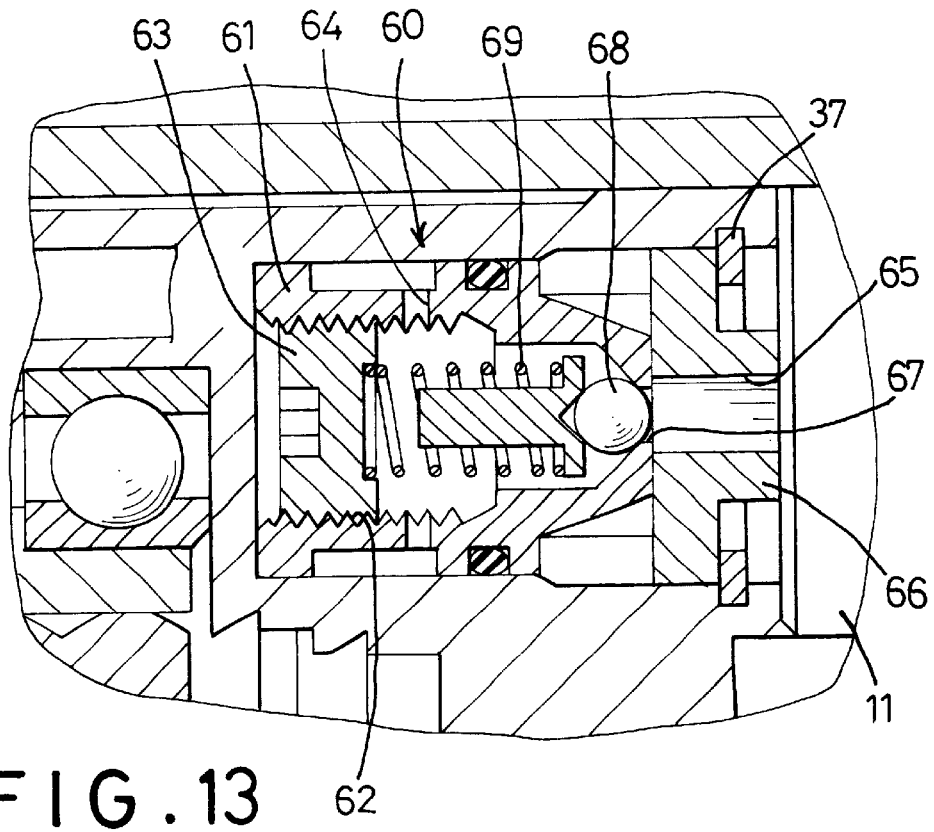
FIG. 13 is an enlarged side plan view in partial cross section of the rotating cylinder with the first check valve in FIG. 10.

With reference to FIG. 13, the first check valve (60) has a hollow body (61), a passage block (66), a ball (68), a biasing member (69) and an adjustment nut (63). The body (61) has a first end defining a central bore (67) and a second end. Multiple bores (64) are defined in the body (61) and simultaneously communicate with the inner space of the second end of the body (61) and the corresponding branch channels (G). The passage block (66) is secured to the first end of the body (61) and has a central passage (65) simultaneously communicating with the first chamber (11) and the central bore (67) in the body (61). The ball (68) abuts the periphery of the central bore (67) at the side far from the passage block (66) to close the central bore (67). The biasing member (69) is mounted between the ball (68) and the second end of the body (61) to provide a force of pushing the ball (68) to seal the central bore (67). The adjustment nut (63) is screwed with an inner thread (62) in the second end of the body (61) and abuts one end of the biasing member (69).

Figure 14:
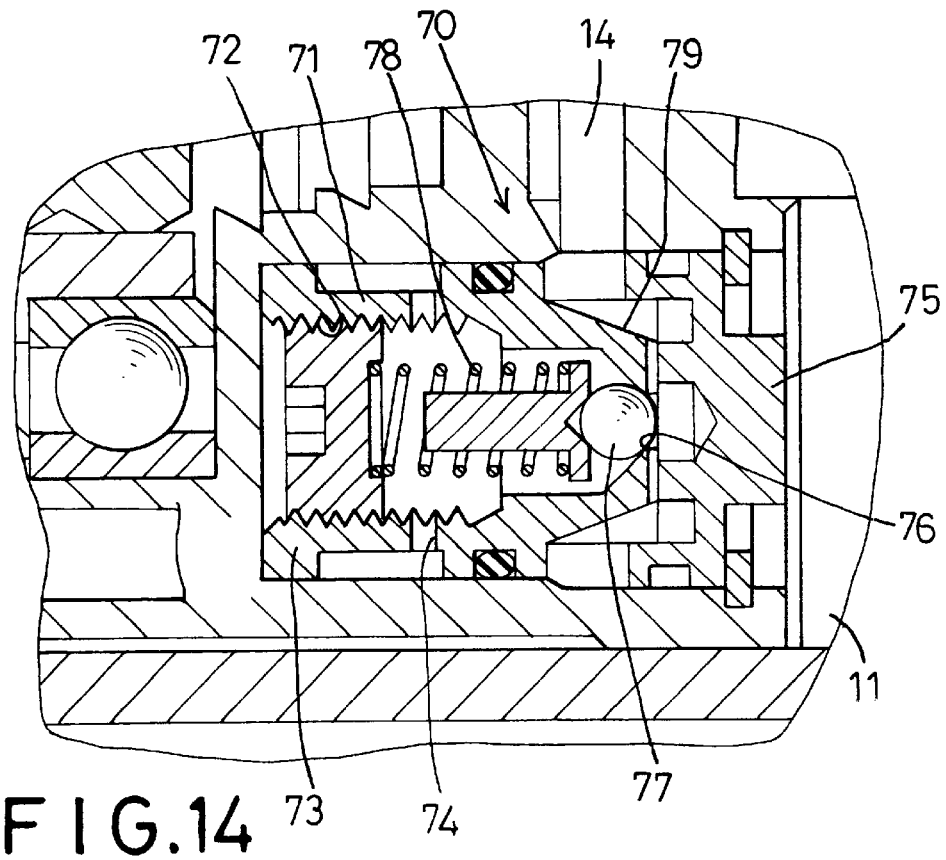
FIG. 14 is an enlarged side plan view in partial cross section of the rotating cylinder with the first check valve in FIG. 9.
Figure 15:
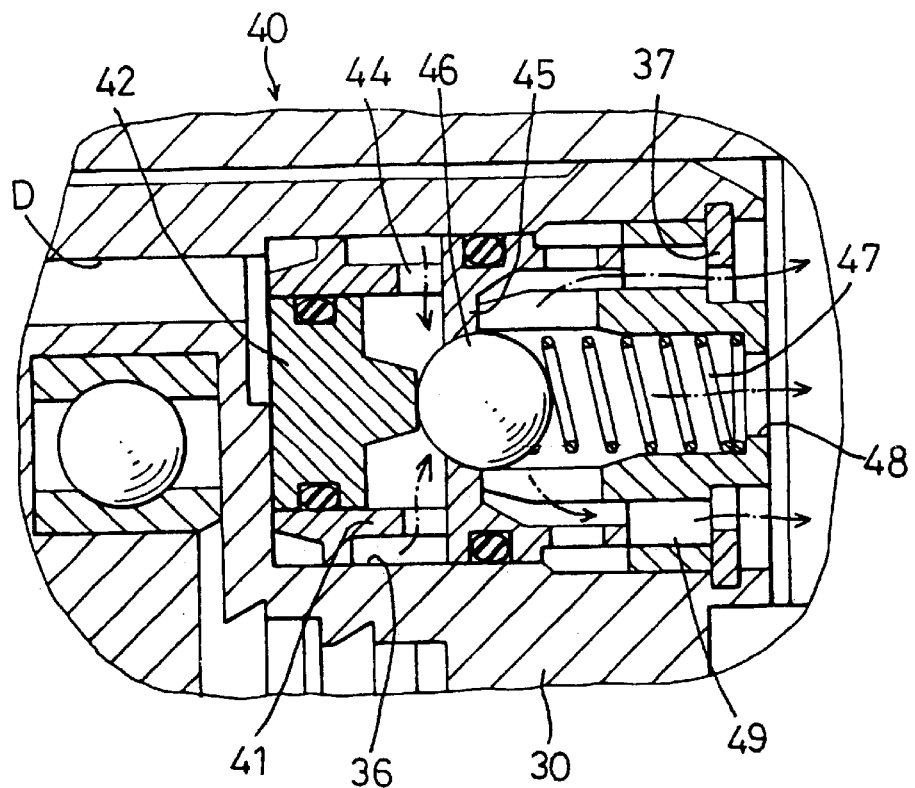
FIG. 15 is an operational enlarged side plan view in partial cross section of the rotating cylinder with the first control valve in FIG. 9 when the pressure source is led into the cylinder through the second I/O channel in the collar.
Figure 16:
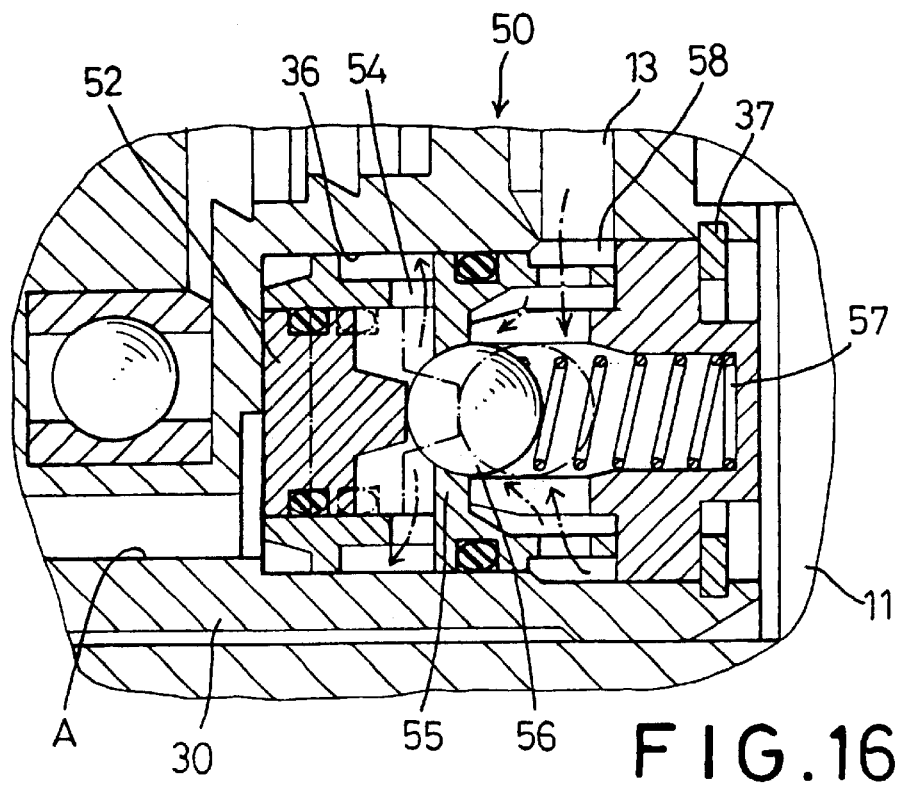
FIG. 16 is an operational enlarged side plan view in partial cross section of the rotating cylinder with the second control valve in FIG. 9 when the pressure source is led into the cylinder through the second I/O channel in the collar.

With reference to FIGS. 10 and 14, the second check valve (70) has a hollow body (71), a passage block (75), a ball (77), a biasing member (78) and an adjustment nut (73). The body (71) has a first end defining a central bore (76) and a second end. Multiple bores (74) are defined in the body (71) and simultaneously communicate with the inner space of the second end of the body (71) and the corresponding branch channels (F). The passage block (75) is secured to the first end of the body (71). Multiple check corridors (79) are defined between the body (71) and the passage block (75) and communicate with the central bore (76) in the body (71) but do not communicate with the first chamber (11). A check passage (14) is defined between the rotating member (30) and the cap (10) and has two ends respectively communicates with the second chamber (12) and the check corridors (79) in the body (71) of the second check valve (70). The ball (77) abuts the periphery of the central bore (76) at the side far from the passage block (75) to close the central bore (76). The biasing member (78) is mounted between the ball (77) and the second end of the body (71) to provide a force of pushing the ball (77) to seal the central bore (76). The adjustment nut (73) is screwed with an inner thread (72) in the second end of the body (71) and abuts one end of the biasing member (78).

In addition, with reference to FIGS. 9 and 10, a securing housing (18) is mounted around the collar (15) and is secured the base of the machine so as to attach the rotatable cylinder to the machine.

To extend the rod (24) of the piston (20) out from the tube (31) on the rotating member (30), with reference to FIGS. 1, 9, 11 and 12, the pressure is led into the cylinder through the first I/O channel (16). For instance, the pressure source is a hydraulic pressure source and oil is led into the cylinder. The oil will flow into the second control valve (50) through the branch channel (B) and the bores (54) in the body (51), and the ball (56) will be pushed away from the through hole in the baffle (55). Consequently, the oil will flow into the second chamber (12) through the body (51) of the second control valve (50) and the I/O passage (13) to push the flange (21) of the piston (20). The piston (20) will move outward relative to the rotating member (30) and the cap (10), and the rod (24) of the piston (20) extends out from the tube (31).

In the meantime, the input oil from the first I/O channel (16) will be also led into the communicating channel (D) so as to push the pushing block (42) in the body (41) of the first control valve (40). The ball (46) of the first control valve (40) will be pushed by the pushing block (42) to leave a position sealing the through hole in the baffle (45) as shown in the phantom lines in FIG. 11. Consequently, the oil in the first chamber (11) will be pushed by the flange (21) of the piston (20) and will pass through the central bore (48), the through hole in the baffle (45) and the bores (44) in the first control valve (40). Then, the oil is discharged from the second I/O channel (17) through the branch channel (E).

With reference to FIGS. 10 and 14, if the oil pressure is higher than a predetermined level while the rod (24) of the piston (20) is extending, the ball (77) in the second check valve (70) will be pushed away from the periphery of the central bore (76) by the oil in the second chamber (12). The oil in the second chamber (12) will flow through the check channel (14), the check corridors (79), the central bore (76), the body (71) and the bores (74) in the body (71) of the second check valve (70). The oil will be discharged from the second I/O channel (17) through the branch channel (F) and thus the pressure in the second chamber (12) is reduced. When the pressure in the second chamber (12) is reduced to the predetermined level, the biasing member (78) will push the ball (77) to close the central bore (76). Accordingly, the pressure in the second chamber (12) is controlled in a desired range.

To retract the rod (24) of the piston (20) into the tube (31) on the rotating member (30), with reference to FIGS. 1, 9, 15 and 16, the oil is led into the cylinder through the second I/O channel (17). The oil will flow into the first control valve (40) through the branch channel (E) and the bores (44) in the body (41), and the ball (46) will be pushed away from the through hole in the baffle (45). The oil will flow into the first chamber (11) through the second control valve (40) to push the flange (21) of the piston (20). The piston (20) will move inward relative to the rotating member (30) and the cap (10), and the rod (24) of the piston (20) is retracted into the tube (31).

In the meantime, the input oil from the second I/O channel (17) will be also led into the communicating channel (A) so as to push the pushing block (52) in the second control valve (50). The protrusion on the pushing block (52) will push the ball (56) to leave a position closing the through hole in the baffle (55) as shown in the phantom lines in FIG. 16. Consequently, the oil in the second chamber (12) will be pushed by the flange (21) of the piston (20) and will pass through the I/O passage (13), the apertures (58), the through hole in the baffle (55) and the bores (54) in the second control valve (50) and thus the oil will be discharged from the first I/O channel (16) through the branch channel (B).

With reference to FIGS. 10 and 13, if the oil pressure is higher than a predetermined level while the rod (24) of the piston (20) is being retracted, the ball (68) in the first check valve (60) will be pushed away from the periphery of the central bore (67) by the oil in the first chamber (11). The oil in the first chamber (11) will flow through the central passage (65) in the passage block (66), the central bore (67), the body (61) and the bores (64) in the first check valve (60) so as to be discharged from the first I/O channel (16) through the branch channel (G). Thus, the pressure in the first chamber (11) is reduced and is controlled in a desired range.

When the adjustment nut (63, 73) in the check valve (60, 70) is rotated relative to the body (61, 71), with reference to FIGS. 13 and 14, the biasing member (69, 78) will be pushed or released by the adjustment nut (63, 73). The tension of the biasing member (69, 78) is changed, such that the pressure for pushing the ball (68, 77) away from the central bore (67, 76) is also changed. This can adjust the predetermined level of pressure in the first or the second chambers (11, 12).

Because the control valves (40, 50) and the check valves (60, 70) are mounted in the rotating member (30) but not mounted on the piston (20), the flange (21) of the piston (20) can be comparatively thin so as to achieve a lightweight cylinder. The torsion for rotating the cylinder and the load to the axle of the machine are low due to the low weight of the cylinder.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A rotatable cylinder for a machine comprising:
   a rotating member having a first end and a second end;
   a cap securely attached to the first end of the rotating member to define an inner space between the cap and the first end of the rotating member;
   a piston moveably mounted in the rotating member and having a rod extending outward from the second end of the rotating member and a flange formed on the rod to divide the inner space into a first chamber and a second chamber;
   a collar mounted around the rotating member and having a first I/O channel and a second I/O channel defined in the collar;
   a first control valve attached to the rotating member and having a first end communicating with the first chamber and a second end communicating with the first I/O channel in the collar;
   a second control valve attached to the rotating member and having a first end communicating with the second chamber through an I/O passage defined between the cap and the rotating member and a second end communicating with the second I/O channel in the collar;
   a first check valve attached to the rotating member and having a first end communicating with the first chamber and a second end communicating with the first I/O channel in the collar; and
   a second check valve attached to the rotating member and having a first end communicating with the second chamber through a check passage defined in the cap and the rotating member and a second end communicating with the second I/O channel in the collar.

2. The cylinder as claimed in claim 1, wherein the rotating member has a tube extending from the first end of the rotating member for the rod of the piston extending through the tube, wherein
   the collar is mounted around the tube; and
   at least one bearing is mounted between the tube and the collar so that the tube can rotate freely relative to the collar.

3. The cylinder as claimed in claim 1, wherein at least one through hole is defined through the flange along an axial direction of the rod;
   a pin extends through the at least one through hole in the flange and has two ends respectively secured to the rotating member and the cap.

4. The cylinder as claimed in claim 1, wherein four main channels are defined in the second end of the rotating member to respectively receive the first and the second control valves and the first and the second check valves; and a communicating channel is defined in a face defining each respective main channel in which one of the control valves is received, wherein the communicating channel corresponding to the main channel receiving the first control valve is communicated with the first I/O channel in the collar; and the communicating channel corresponding to the main channel receiving the second control valve is communicated with the second I/O channel in the collar.

5. The cylinder as claimed in claim 4, wherein two branch channels are defined in the second end of the rotating member and are arranged near each respective main channel, wherein each branch channel has a front section, a middle section and a distal section in a sequence from the second end of the rotating member to the first end;

the front section of each respective branch channel is communicated with the corresponding main channel through a corridor;

the middle sections of the branch channels corresponding to the main channels receiving the second control valve and the first check valve are communicated with the first I/O channel in the collar; and the distal sections of the branch channels corresponding to the main channels receiving the first control valve and the second check valve are communicated with the second I/O channel in the collar.

6. The cylinder as claimed in claim 5, wherein the first control valve comprises:

a hollow body having a first end defining a central bore to communicate with the first chamber and a second end communicating with the corresponding one of the communicating channels;

a pushing block moveably mounted in the second end of the body;

a baffle formed on a middle portion of the body to divide an inner space of the body into two chambers;

a through hole defined in the baffle to communicate the two chambers in the body;

multiple bores defined in the body and simultaneously communicating with the chamber near the second end of the body and the corresponding branch channels;

a ball moveably mounted in the body and abutting a periphery of the through hole in the baffle at a side far from the pushing block to close the through hole; and a biasing member mounted between the ball and the first end of the body to provide a force of pushing the ball to seal the through hole.

7. The cylinder as claimed in claim 6, wherein a protrusion is formed on the pushing block and abuts the ball.

8. The cylinder as claimed in claim 5, wherein the second control valve comprises:

a hollow body having a first closed end and a second end communicating with the corresponding one of the communicating channels;

a pushing block moveably mounted in the second end of the body;

a baffle formed on a middle portion of the body to divide an inner space of the body into two chambers;

a through hole defined in the baffle to communicate the two chambers in the body;

multiple bores defined in the body and simultaneously communicating with the chamber near the second end of the body and the corresponding branch channels;

multiple apertures defined in the body and communicating with the chamber near the first end of the body;

a ball moveably mounted in the body and abutting a periphery of the through hole in the baffle at a side far from the pushing block to close the through hole; and a biasing member mounted between the ball and the first end of the body to provide a force of pushing the ball to seal the through hole; and the I/O passage is defined through the rotating member and the cap and has two ends respectively communicating with the second chamber and the apertures in the body of the second control valve.

9. The cylinder as claimed in claim 8, wherein a protrusion is formed on the pushing block and abuts the ball.

10. The cylinder as claimed in claim 5, wherein the first check valve comprises:

a hollow body having a first end defining a central bore facing the first chamber and a second end;

multiple bores defined in the body and simultaneously communicating with an inner space of the second end of the body and the corresponding branch channels;

a passage block secured to the first end of the body and having a central passage simultaneously communicating with the first chamber and the central bore in the body;

a ball moveably mounted in the body and abutting a periphery of the central bore at a side far from the passage block to close the central bore; and a biasing member mounted between the ball and the second end of the body to provide a force of pushing the ball to seal the central bore.

11. The cylinder as claimed in claim 10, wherein an adjustment nut is screwed into the second end of the body and abuts one end of the biasing member.

12. The cylinder as claimed in claim 5, wherein the second check valve comprises:

a hollow body having a first end defining a central bore facing the first chamber and a second end;

multiple bores defined in the body and simultaneously communicating with an inner space of the second end of the body and the corresponding branch channels;

a passage block with a closed end secured to the first end of the body;

multiple check corridors defined between the body and the passage block and communicating with the central bore in the body;

a ball moveably mounted in the body and abutting a periphery of the central bore at a side far from the passage block to close the central bore; and a biasing member mounted between the ball and the second end of the body to provide a force of pushing the ball to seal the central bore; and the check passage is defined between the rotating member and the cap and has two ends respectively communicate with the second chamber and the check corridors in the body of the second check valve.

13. The cylinder as claimed in claim 12, wherein an adjustment nut is screwed into the second end of the body and abuts one end of the biasing member.

14. The cylinder as claimed in claim 1 further comprising a securing housing mounted around the collar and adapted to be secured on a base of the machine.

* * * * *